United States Patent
Reyburn

[11] Patent Number: 5,963,299
[45] Date of Patent: Oct. 5, 1999

[54] METHOD AND APPARATUS FOR MEASURING TORIC CONTACT LENS ROTATION

[76] Inventor: Thomas P. Reyburn, 127 E. Maple, Fruitport, Mich. 49415

[21] Appl. No.: 08/898,623

[22] Filed: Jul. 22, 1997

[51] Int. Cl.⁶ .............................. G02C 7/02; A61B 3/10; G01B 1/00
[52] U.S. Cl. .......................... 351/177; 351/212; 351/247; 33/507
[58] Field of Search .......................... 351/160 R, 160 H, 351/161, 162, 177, 212, 247; 33/507

[56] References Cited

U.S. PATENT DOCUMENTS

| | | |
|---|---|---|
| 449,681 | 4/1891 | Lasar . |
| 1,415,833 | 5/1922 | Ginsburg . |
| 1,532,878 | 4/1925 | Bugbee . |
| 1,919,791 | 7/1933 | Larkin . |
| 2,464,547 | 3/1949 | Allyn ............................................. 88/20 |
| 4,201,226 | 5/1980 | Phillips ..................................... 128/774 |
| 4,268,133 | 5/1981 | Fischer ..................................... 351/161 |
| 4,309,085 | 1/1982 | Morrison ................................... 351/39 |
| 4,322,139 | 3/1982 | Wichterle ................................. 351/160 |
| 4,358,897 | 11/1982 | Hornbeck .................................. 33/343 |
| 4,901,443 | 2/1990 | Lakhman ................................... 33/391 |
| 4,976,533 | 12/1990 | Hahn ........................................ 351/160 |
| 5,038,489 | 8/1991 | Muehlenbein ............................. 33/512 |
| 5,062,701 | 11/1991 | Drazba ..................................... 351/160 |
| 5,184,405 | 2/1993 | Cress ......................................... 33/1 SD |
| 5,517,259 | 5/1996 | Blum ........................................ 351/160 |
| 5,528,321 | 6/1996 | Blum ........................................ 351/160 |
| 5,561,482 | 10/1996 | Miyake .................................... 351/208 |
| 5,686,981 | 11/1997 | Anan et al. ............................... 351/212 |

FOREIGN PATENT DOCUMENTS 2211609  7/1989  United Kingdom .

OTHER PUBLICATIONS

Life–Link Slope Meter, Life–Link International of Jackson Hole, Wyoming, © 1980.

*Primary Examiner*—Scott J. Sugarman
*Attorney, Agent, or Firm*—Price, Heneveld, Cooper, DeWitt and Litton

[57] ABSTRACT

A method and apparatus for accurately observing a toric contact lens rotation for determining the prescription of a contact lens on an astigmatic eye, by providing a lens line guide alignment plate having a gravity responsive pivotal indicator, angle indicia arranged about the indicator, and a guide edge spaced from the indicator, a contact lens having at least one indicator marking, a slit lamp or other device for projecting a slit light beam on the lens to bisect the lens, rotationally orienting the slit light beam into alignment with the contact lens indicator marking, angularly orienting the guide edge to be in alignment with the rotated slit light beam, and reading the angle of the pivotal indicator relative to the indicia to ultimately determine the toric lens prescription.

6 Claims, 3 Drawing Sheets

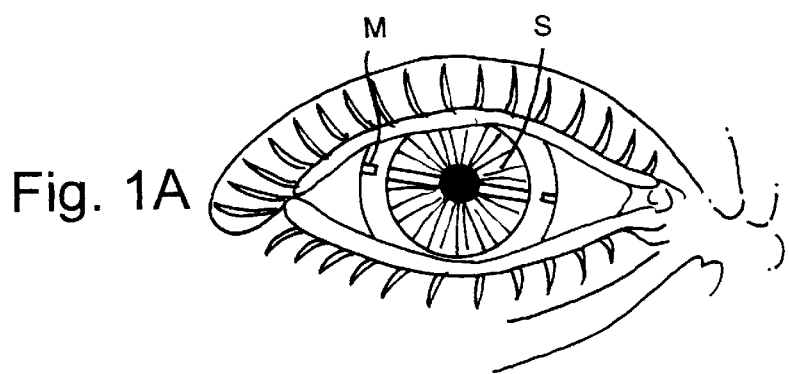
Fig. 1A
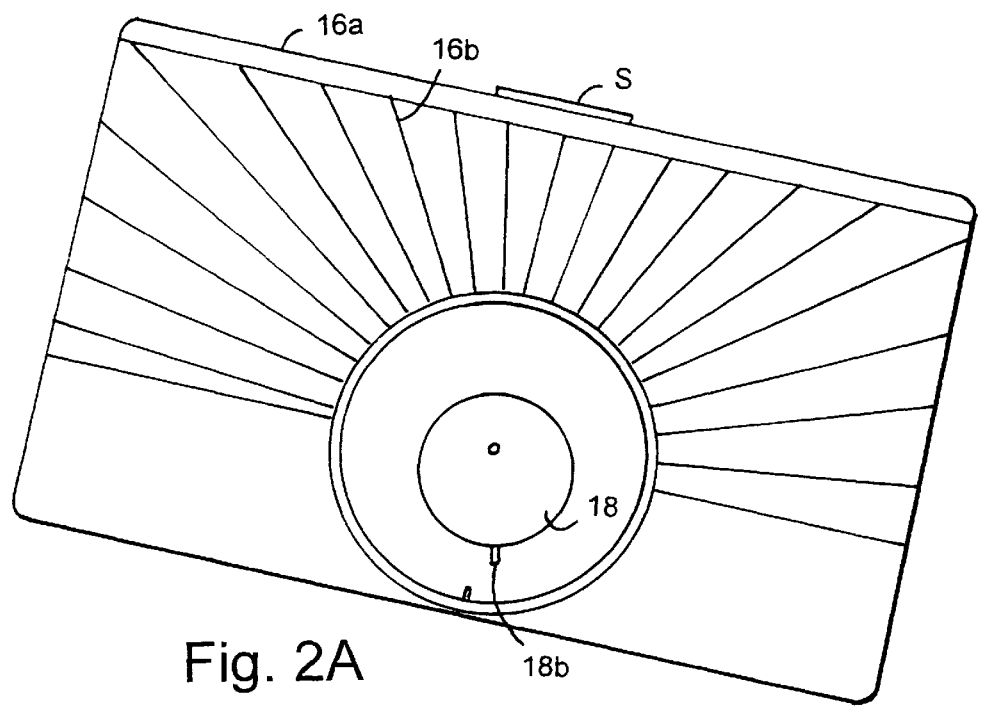
Fig. 2A
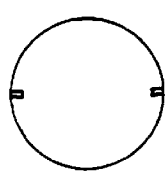 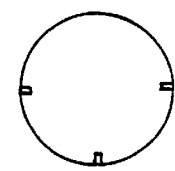 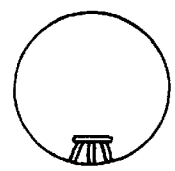 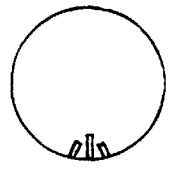 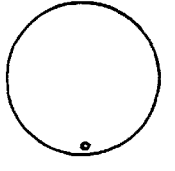
Fig. 3A    Fig. 3B    Fig. 3C    Fig. 3D    Fig. 3E

METHOD AND APPARATUS FOR MEASURING TORIC CONTACT LENS ROTATION

BACKGROUND OF THE INVENTION

This invention relates to a method and apparatus for measuring the rotation of a corrective contact lens.

The characteristic of astigmatism as applied to the eye itself is typically corrected by an asymmetric prescription of the corrective lens, which is called a toric contact lens. If the amount of astigmatism is known, there are known ways of manufacturing the asymmetric lens in order to cause the focus to occur on the retina. Frequently, however, difficulty occurs in the accurate determination of the prescription for the eye of a particular person having astigmatism, and wishing to wear contact lenses.

To aid in this determination, contact lens manufacturers are known to create tiny, almost invisible markings such as dots and/or lines on the lens, located at the edges of the convexly curved lens. These markings can be formed by known techniques. With placement of the lens on the cornea of the eye, a care giver such as an optometrist, an oculist, or an ophthalmologist, estimates the amount of lens rotation on the eye, usually from the horizontal or from the vertical, and prescribes according to the effect the rotation has on the person's astigmatism, the prescription being for a corrective toric contact lens. Such estimates are too often not accurate enough, resulting in under-correction or over-correction.

There are two degrees of astigmatism to address, 1) the location in degrees of the astigmatism in the patient's spectral prescription, and 2) the amount in degrees of rotation of the toric contact lens. The examination lens of the care provider provides the 1) location between 0 and 180°. When the angle 2) is determined, it has to be added to or subtracted from the prescription for astigmatism. That is, if the contact lens rotation is clockwise, it is called "left add" or "LA," and if it is counterclockwise, it is called "right subtract" or "RS." This 2) rotation is caused by eyelid pressure and gravitational pull, sometime aided by prism ballast of the lens.

Techniques and devices have been proposed for more accurately ascertaining the degree of lens rotation, but these are typically considered too complex, or difficult or inaccurate to use, and therefore are not believed to be widely employed by care givers.

SUMMARY OF THE INVENTION

This invention provides apparatus and a method of easily, quickly and accurately measuring the rotation of a toric contact lens on the eye of a patient, enabling the clinician to properly prescribe astigmatism correcting toric contact lenses. These and other features, advantages and objects of the present invention will be further understood and appreciated by those skilled in the art and profession by reference to the following specification, claims and appended drawings.

BRIEF DESCRIPTION OF THE DRAWINGS

FIG. 1A is a diagrammatic front view of the eye and slit light beam thereon angularly aligned with the markings of the contact lens on the eye;

FIG. 2A is a front elevational view of the alignment indicator plate angularly oriented to align its guide edge with the slit light beam;

FIGS. 3A–3E are diagrammatic views depicting five of the commonly used markings on commercially available contact lenses;

DETAILED DESCRIPTION OF PREFERRED EMBODIMENTS

Figure 1:
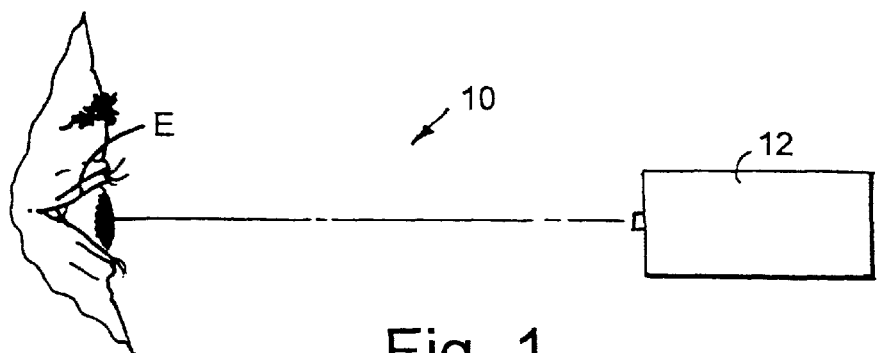
FIG. 1 is a diagrammatic side view of a slit lamp and patient's eye.
Figure 2:
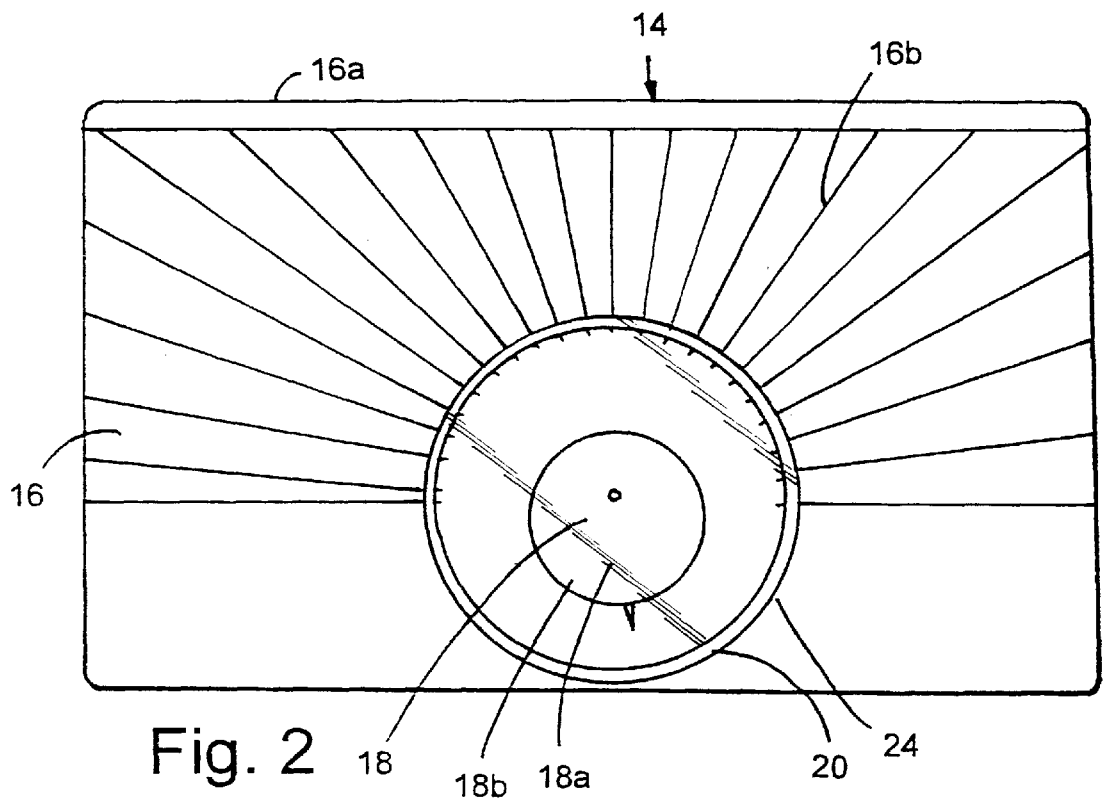
FIG. 2 is a front elevational view of the alignment indicator plate.

Referring now specifically to the drawings, in FIG. 1 is shown the combination apparatus 10 of a rotational slit lamp 12 capable of projecting an illuminated slit of light relative to a toric contact lens on eye E. The slit light lamp is aligned with the contact lens on the eye in a manner to bisect the lens, and rotated to align with the lens markings as shown in FIG. 1A, i.e., the slit light beam S is angularly aligned with lens markings M. Then the patient backs away from the slit lamp if and as necessary for the flat alignment indicator plate 14 to be placed in the path of slit light beam S. Alignment indicator plate 14 comprises a generally rigid, flat plate 16 as of polymeric material, having a straight upper guide edge 16a, and a gravity responsive indicator 18, preferably a pivotal indicator, mounted on the card at a pivot point 18a offset from guide edge 16a and including an indicator pointer 18b oriented toward radially oriented angle indicia 20 arranged arcuately and concentrically about the pivot point 18a. This pivot point 18a is located off center of indicator 18, opposite indicator pointer 18b. Indicator 18 is preferably located within an enclosed transparent bubble housing 24. An alternative to the pivotal indicator is a gravity responsive ball located in an annular track housing on the plate to roll to the angle with tilting of the plate. The zero point indicium of the angular indicia 20 is preferably on a phantom line perpendicular to guide edge 16a. Angular numbers increase from this zero point in both opposite arcuate directions. This plate is manually rotated angularly to align its guide edge 16a with the angular slit light beam S. This causes indicator 18 to pivot on point 18a so that indicator pointer 18b moves offset through an arc to a specific angular indicium 20. The care giver then ascertains this offset angle and the direction, whether clockwise or counterclockwise, so that this offset angle can be added or subtracted from the patient's spectral astigmatism prescription angle.

Optionally, additional angular indicia 16b can be arranged above the indicator, in protractor fashion.

In practicing the invention herein, a contact lens, having at least one marking 30 at the edge thereof, is placed on the eye to be evaluated. These lines or any alternative markings 30 typically are normally almost invisible. The presence of eyelids pressing on the toric contact lens and the gravitational pull on the lens, especially if it has prism ballast, will cause the lens to rotate on a cornea having astigmatism characteristics, causing markings 30 to be at an angle to the horizontal or to the vertical. Each eye of each patient is normally different. In order to ascertain the angular location of these markings, a slit light beam source, preferably slit lamp 12, is activated, directed toward the eye, and rotated until the slit of light is oriented to align with markings 30 and illuminates them. This orientation step is preferably repeated several times due to the initial instability of the toric contact lens on the cornea. Then, independent of the patient, indicator plate 16 is placed with its upper guide edge 16a held in visual alignment with the angular slit light beam. When this is done, indicator 18 will pivot on its pivot point 18a so that its indicator point 18b is oriented to the specific angle reading of the angular lens lines 30. This is the angle of the oriented plate. By so doing, the exact angle of lens rotation is determined so that the contact lens can be prescribed.

Figure 4:
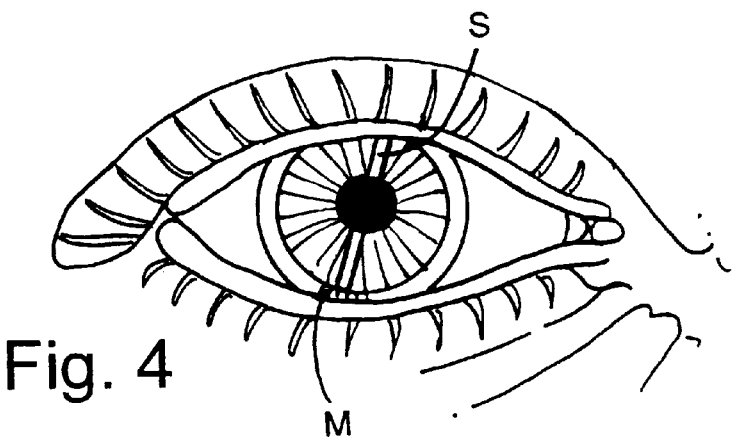
FIG. 4 is a diagrammatic front view of the eye with an alternatively marked contact lens and slit light beam.
Figure 5:
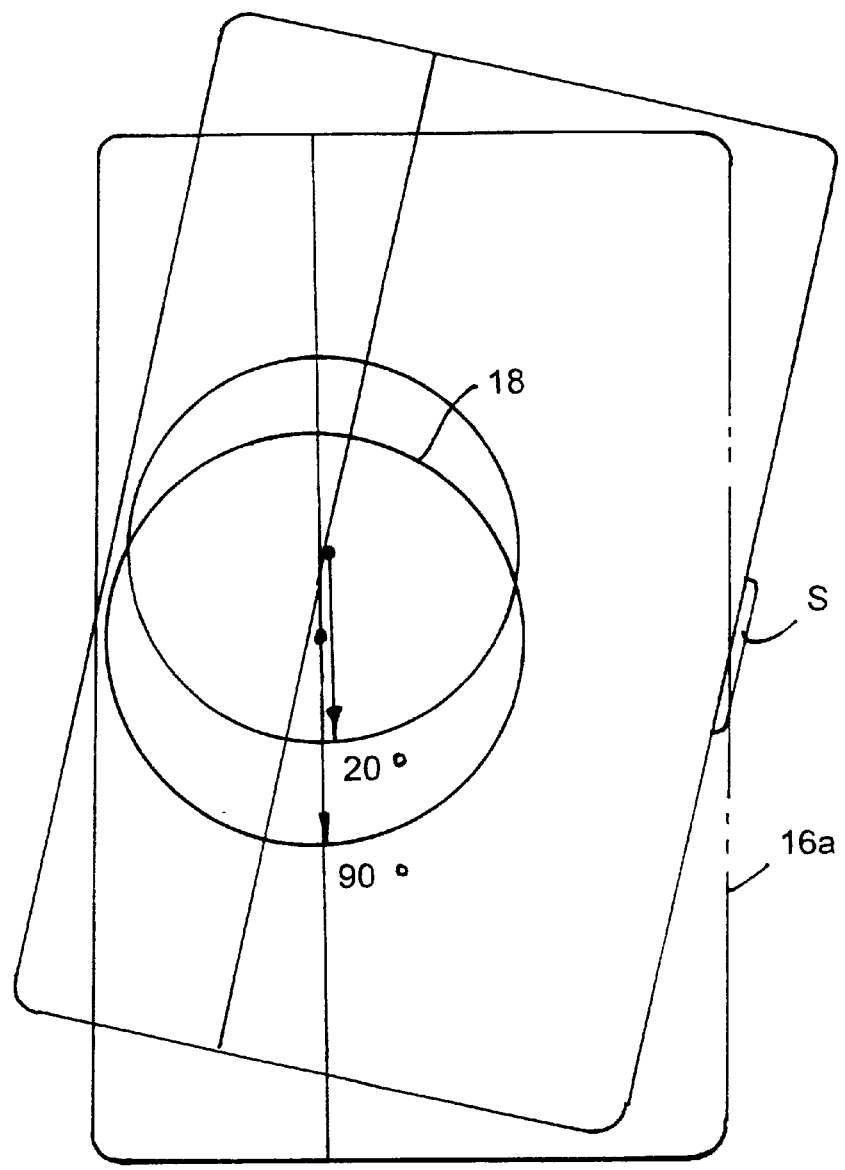
FIG. 5 is a diagrammatic view of the alternative positioning of the plate in a vertical orientation, aligned with the slit light beam.

Referring to FIGS. 4 and 5, the invention can be employed to measure the lens rotation using the vertical axis, i.e., the angle from the true vertical orientation, the result being a pivotal orientation movement of the indicator relative to the angular indicia therearound. The prescription can then be determined by the angular offset as previously described. Thus the slit light beam S is aligned with the contact lens markings M offset from vertical (FIG. 4) and then indicator 18 is aligned at its guide edge 16a with the slit light beam S (FIG. 5) and the angle from vertical read off the alignment indicator plate.

The above description is considered that of the preferred embodiments only. Modifications of the invention will occur to those skilled in the art and to those who make or use the invention. For example, a magnifier lens could be built into plate 14 to allow easier reading of the angles. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method of determining the rotation of a toric contact lens on a person's cornea comprising the steps of:

providing a lens guide alignment plate having a gravity responsive indicator, angle indicia arranged arcuately about said indicator, and a guide edge spaced from said indicator;

providing a contact lens having at least one edge indicator marking;

placing said contact lens on a person's eye to be evaluated;

providing a light source capable of projecting a slit light beam on said lens;

rotationally orienting said slit light beam to an angle in alignment with said contact lens indicator marking;

angularly orienting said guide edge to be in alignment with said slit light beam; and reading the angle of said indicator relative to said indicia to determine the toric lens angle of rotation clockwise or counterclockwise.

2. The method in claim 1 wherein said angular orienting of said guide edge is off horizontal, and said angle is measured from horizontal.

3. A method of determining toric contact lens prescription on an astigmatic cornea, comprising the steps of:

determining the location angle of astigmatism of a person's cornea;

providing a lens guide alignment element having a gravity responsive pivotal indictor, angle indicia arranged arcuately about said indicator, and a guide edge spaced from said indicator;

providing a contact lens having at least one edge indicator marking;

placing said contact lens on a person's eye to be evaluated;

rotationally orienting a slit light beam in alignment with said contact lens indicator marking;

angularly orienting said guide edge to be in alignment with said slit light beam;

reading the angle of said pivotal indicator relative to said indicia to determine the clockwise or counterclockwise rotation of the toric angle lens on the cornea; and adding the clockwise lens rotation angle to said astigmatism location angle or subtracting the counterclockwise lens rotation angle from said astigmatism location angle.

4. A method of determining a toric contact lens angle of lens rotation on the cornea of a person's eye comprising the steps of:

providing a lens guide alignment element having arcuately arranged angle indicia, and a guide edge spaced from said indicia;

providing a contact lens having at least one edge indicator marking at the edge of the lens;

placing said contact lens on a person's eye to be evaluated;

illuminating said marking;

angularly orienting said guide edge to be in alignment with said illuminated marking; and reading the angle of said indicia.

5. The method in claim 4 wherein said angular orienting of said guide edge is off horizontal, and said angle is measured from horizontal.

6. A toric contact lens rotation indicator for evaluating an astigmatic cornea comprising a lens guide alignment plate having a straight, top guide edge for alignment with a contact lens indicia marking; a gravity responsive indicator on said alignment plate, spaced from said guide edge, and angular indicia arranged arcuately about said indicator, including an angle indicium on a line perpendicular to said top edge, arranged so that by angularly aligning said reference top edge with a contact lens indicia marking, the toric contact lens angle of rotation can be determined from said angular indicia.

* * * * *